United States Patent [19]

Boeve

[11] Patent Number: 5,101,223
[45] Date of Patent: Mar. 31, 1992

[54] IMAGE-REPRODUCING APPARATUS

[75] Inventor: Gerard J. Boeve, Edegem, Belgium

[73] Assignee: AGFA Gevaert, N.V., Mortsel, Belgium

[21] Appl. No.: 447,526

[22] Filed: Dec. 7, 1989

[30] Foreign Application Priority Data

Dec. 15, 1988 [BE] Belgium ............................ 88202891

[51] Int. Cl.⁵ ............................................. G01D 15/14
[52] U.S. Cl. ................................... 346/108; 346/138
[58] Field of Search .............. 358/471, 474, 490, 491, 358/494, 296; 350/6.1, 6.2, 6.3, 6.4, 6.5; 346/108, 160, 138

[56] References Cited

U.S. PATENT DOCUMENTS

| | | | |
|---|---|---|---|
| 3,823,276 | 7/1974 | Maslowski et al. | 346/108 |
| 3,875,587 | 4/1975 | Pugsley | 358/80 |
| 4,293,864 | 10/1981 | Scott | 346/108 |
| 4,853,709 | 8/1989 | Stein et al. | 346/108 |

*Primary Examiner*—Edward L. Coles, Sr.
*Assistant Examiner*—Thomas D. Lee
*Attorney, Agent, or Firm*—William J. Daniel

[57] ABSTRACT

An image-reproducing apparatus of the internal drum type, in which a linear slide (33) with a reproducing head (32) with a rotatable beam reflector (27), is arranged for translation along two guides in the form of two glass rods (39,43), the sliding contact of the slide with one rod being a two-point (40,41) and with the other rod being a one-point (55) contact.

9 Claims, 3 Drawing Sheets

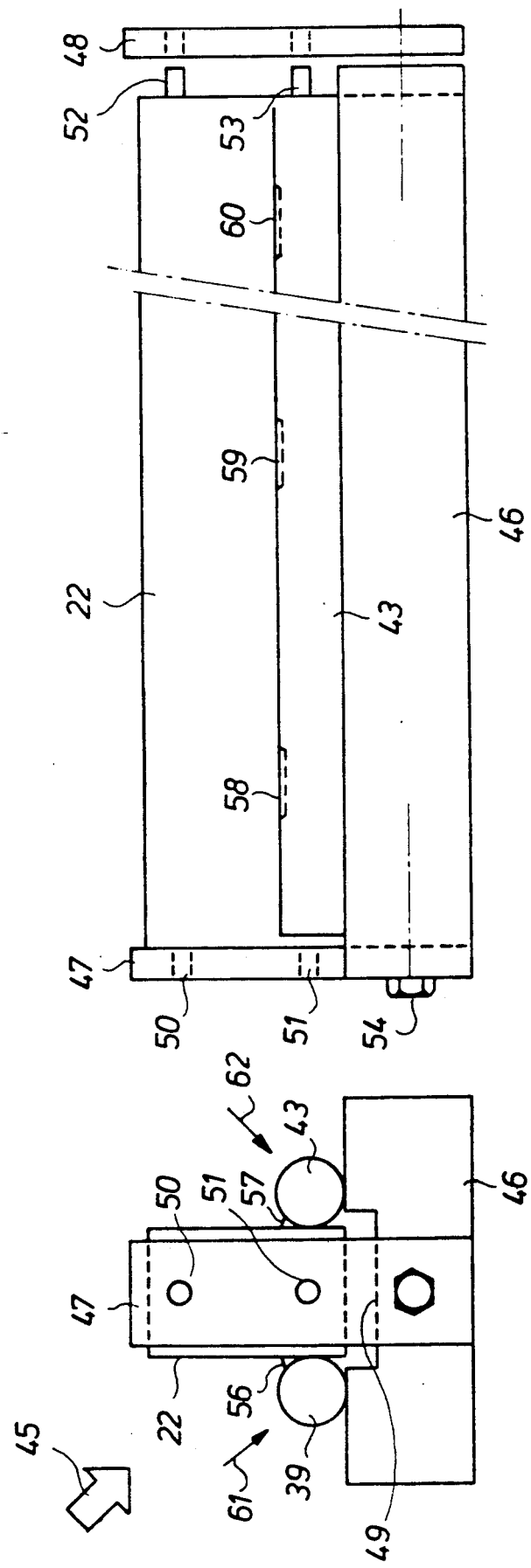

IMAGE-REPRODUCING APPARATUS

BACKGROUND OF THE INVENTION

1. Field of the Invention

The present invention relates to an image-reproducing apparatus for the line-wise exposure of a light-sensitive sheet placed on the surface of a drum, by means of a reproducing head revolving in the drum. These apparatus are also known as "internal drum" exposure apparatus.

2. Description of the Prior Art

A method is known of reproducing an image on a light-sensitive surface by scanning the surface with a light beam modulated in accordance with an electric signal representing the density of successive elements of the image, which method comprises the steps of: mounting the light-sensitive recording surface on the cylindrical surface of a stationary cylinder, mounting a rotatable prism having a plurality of internal reflecting surfaces, with a number of said surfaces sequentially reflecting an incident light beam, within and on the axis of said cylinder and rotating said reflector about the said axis; directing a light beam along the axis of said cylinder so that it is internally reflected by said number of surfaces internally to said cylindrical surface to define a circular track thereon; and progressively displacing said circular track along said cylindrical surface to define a scanning raster on the said light-sensitive surface mounted on said cylindrical surface by relative movement of said cylinder and light-sensitive surface on the one hand and said prism on the other hand in a direction parallel to the axis of said cylinder.

The mentioned method is disclosed in U.S. Pat. No. 3,875,587.

The displacment of the circular track along the cylindrical surface occurs in practice by axially displacing the rotatable prism in the cylinder by means of a carriage or a sliding table that is displaceable along a suitable rail system.

Known rail systems comprising ball guides or roller bearing guides cause vibrations if adjusted for zero play, and therefore are unacceptable in high resolution printing systems, such as in graphic printers, and printers used for the printing of medical diagnostic images, obtained by suitably processed digitized radiographic, ultrasonic, NMR or other signals.

Air bearings require a source of pressurized air for their operation, whereas a lack of stiffness may cause problems with the accuracy of reproduction. Slide bearings are capable of offering smooth and vibration-free transports, but to that end they require precision-ground and precision-polished metal slides or rods which inevitably are expensive.

SUMMARY OF THE INVENTION

Object of the Invention

The present invention aims to provide an image-reproducing apparatus which comprises a linear slide which shows a high precision and which is inexpensive to manufacture.

Statement of the Invention

According to the present invention, an image-reproducing apparatus comprising a cylinder, which is arranged for receiving a light-sensitive recording sheet on one of its surfaces, a reproducing head for linewise exposing the said light-sensitive recording sheet to form an image thereon, said reproducing head bearing reflecting means arranged for rotation about the axis of the cylinder to reflect a light beam that enters the cylinder axially, onto the surface of the cylinder thereby to cause said beam to move along a circular track of the cylindrical surface, and said reproducing head being mounted on a linear slide for displacement of the head in a direction parallel to the axis of the cylinder to cause progressive displacement of the circular track along the cylindrical surface, is characterized thereby that said linear slide is journalled for translational movement on two axially extending bearing rods, said rods being glass rods that are glued in accurate parallelism onto a bearing beam, and the contact of the linear slide with one rod being a two-point sliding contact, and with the other rod being a one-point sliding contact.

The term "point" contact indicates the contact of the linear slide, more precisely of a bearing surface thereof, with the bearing rod, considered in a plane that is normal to the direction of displacement of the slide. It will be understood that said contact, considered along the direction of displacement of the linear slide, is a line contact.

The merits of the invention consist in the recognition of particular characteristics of standard glass rods which make them particularly suitable for the described application. These characteristics are the extreme smoothness and hardness of the surface of the rods, the satisfactory roundness, and the sufficiently large flexibility in the longitudinal direction whereby the correction of deviations of the straightness of the rods requires but limited forces in order to render the rods straight. The ultimate straightness of the rods is determined by the straightness of the bearing beam. The bearing beam is usually made of steel, aluminium or the like, either as a hollow or as a solid member. Such like members are easy to manufacture as a straight element, but their machining to give their occasional bearing surfaces a smooth finish, is expensive. The present invention combines the distinct good characteristics of two different bearing elements with each other, namely the straightness of a metal bearing beam, with the smoothness of a standard glass rod, while avoiding the respective uninteresting characteristics, whereby a sliding bearing with excellent characteristics can be made at a reduced cost.

According to a preferred embodiment of the invention, the two-point sliding contact is obtained via a V-shaped groove provided in a low-friction bearing guide block fitted to the linear slide, and the one-point contact is obtained via a flat-surface bearing block.

BRIEF DESCRIPTION OF THE DRAWINGS

The invention will be described hereinafter by way of example with reference to the accompanying drawings, wherein:

FIG. 3 is a front, and

FIG. 4 is a side view of a caliber for the mounting of glass rods on the bearing beam.

Referring to FIG. 1, an internal drum scanner which is mounted within a light-tight housing 10, comprises a HeNe laser 11, an acousto optical modulator 12, a polarizing filter 13, lenses 14 and 15, two mirrors 16 and 17 for deflecting the light beam 18 of the laser over 180 degrees so that it coincides as a beam 19 with the axis 9 of a cylinder 20.

Figure 1:
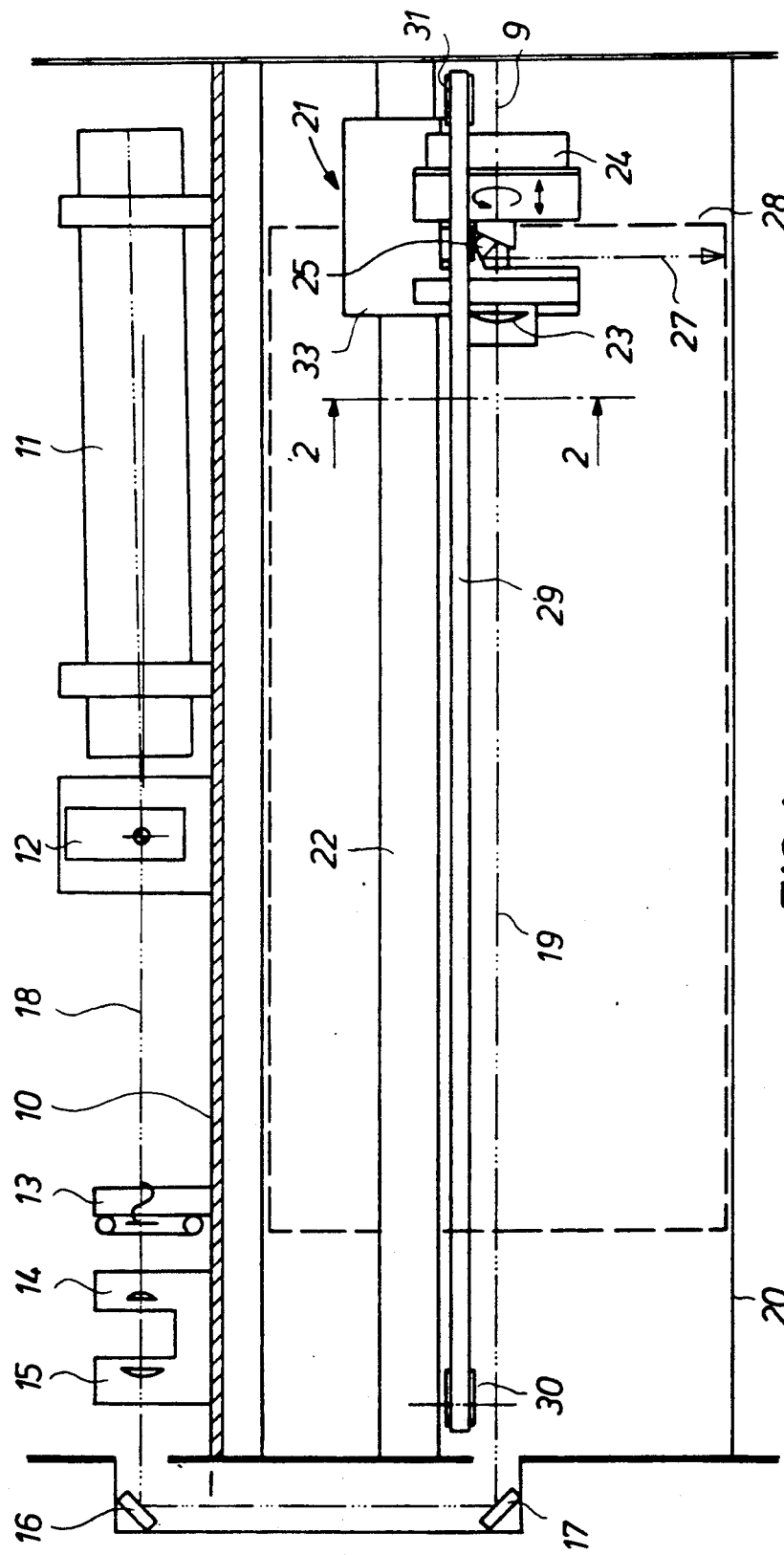
FIG. 1 is a diagrammatic representation of one embodiment of an internal drum scanner.

More details about a suitable adjustable mounting of the mirrors 16 and 17 may be found in the co-pending application entitled "Adjustable mirror assembly" filed on even day herewith.

Inside the cylinder 20 there is provided a reproducing head 21 that is displaceable along a stationary beam 22 running strictly parallel with the axis of the cylinder 20. The reproducing head comprises an input lens 23, and a motor 24 bearing on its shaft a pentaprism 25 for deflecting the radiation beam 19 over 90 degrees towards the surface of the cylinder, as indicated by the broken line 27.

On the inner surface of the cylinder there is provided a light-sensitive sheet 28 illustrated in broken lines, the film sheet being arranged with its sensitive side innermost.

The axial displacement of the reproducing head in the cylinder occurs by means of an endless belt 29 which is tensioned over two pulleys 30 and 31, one of the pulleys being coupled to a motor, not illustrated, for rotation of the belt alternatingly in one or the other direction.

The combination of the rotating movement and the translating movement of the pentaprism 25 causes a scanning of the light-sensitive surface of the sheet 28 by the deflected beam section 27.

Figure 2:
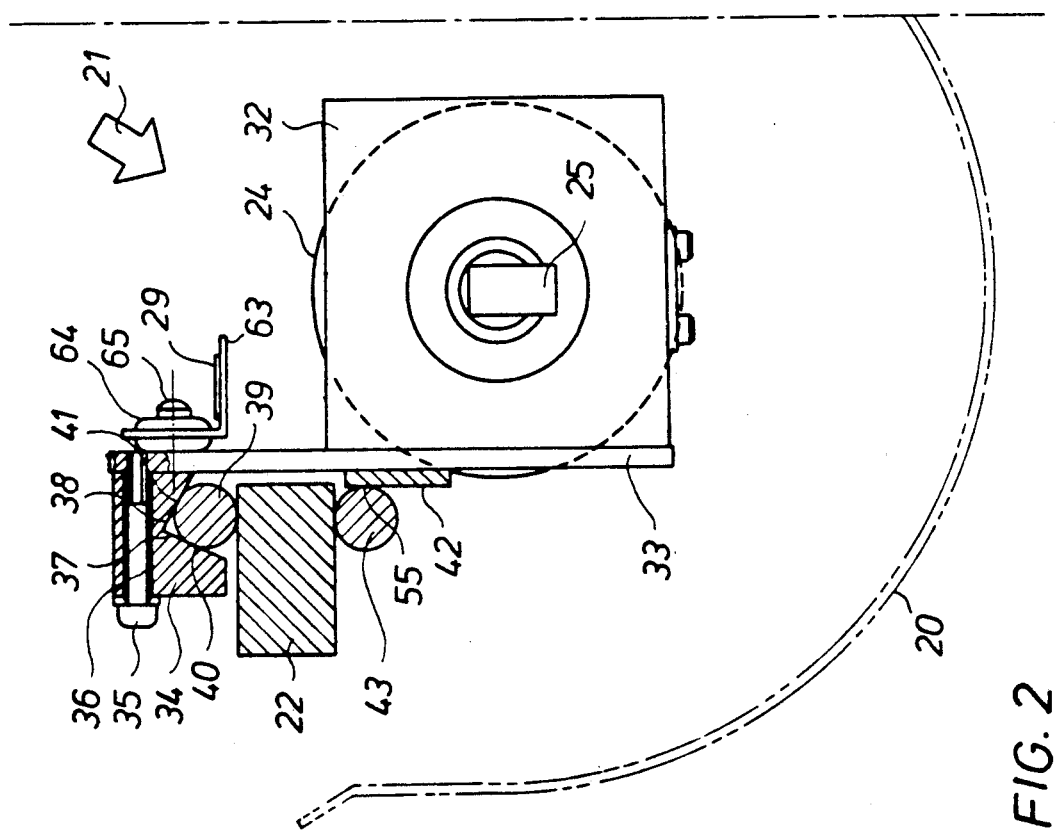
FIG. 2 is a sectional view in detail on line 2—2 of FIG. 1.

The sliding bearing of the reproducing head 21 on the stationary beam 22 is illustrated in detail in FIG. 2 which is a partial section of FIG. 1 on line 2—2.

Referring to FIG. 2, the motor 24 is mounted on a base plate 32 that in its turn is fitted to a linear slide 33. The slide 33 has a first bearing element 34 fitted at its upper end by means of horizontally spaced bolts 35 that pass through bores in the element 34 and are screwed into the slide 33. The bearing element 34 is in the present case a plastic one, and therefore bushings 36 are fitted in the bores of the element to limit the pressure of the bolts on the element.

The bearing element 34 has an angled cut-out portion at its underside which defines two bearing surfaces 37 and 38 that are oriented such that contact with a bearing rod 39 occurs at two points 40 and 41 that are located in opposite upper quadrants of the rod.

The slide 33 has a second bearing element 42 in the form of a plastic strip that is adhered to the slide 33, and that is in sliding contact with a second bearing rod 43 at a point 55.

The contact of the linear slide 33 with the bearing rods 39 and 43 is thus a three-point contact which, actually, is a three-line contact as explained already in the introduction of the description.

Gravity causes the mass of the reproducing head to be supported almost completely by the upper rod 39, the lower rod 43 controlling merely the angular position of the head 21 around the rod 39. The bearing elements 34 and 42 are made from a material showing a low friction with respect to the guide rods with which they co-operate, in the absence of any liquid lubricant.

The coupling of the linear slide 33 to the drive belt 29 is accomplished by means of a bracket 63, a resilient ring 64, and a pin 65. The bracket may be a light-metal one, fitted to the belt by a rivet or the like, whereas the ring 64 in a most simple embodiment may be formed by a plastic bushing as used in electronics. The movability of the pin 65 of the linear slide with respect to the bracket 63 does not affect the accuracy of the exposure system. On the contrary, the flexible driving connection of the belt with the linear slide effectively eliminates vibrations caused by the belt drive system.

The guide rods 39 and 43 are standard glass rods obtainable from manufacturers of glass equipment. They have been manufactured by spin-drawing molten glass and are available in a wide variety of diameters and lengths. Their roundness is excellent as a consequence of the spinning process, but their straightness is imperfect, probably as a consequence of tension gradients arising after the cooling of the molten glass, and of insufficient control of their straightness during the cooling.

The forces that are required to straighten such glass rods are small, as compared with forces that would be required for the straightening of equally sized metal rods. In accordance with the invention the straightness of the glass guide rods is controlled by a metal beam.

More precisely, the glass guide rods 39 and 43 are fitted to the metal guide beam 22 by means of adhesive.

This fitting may occur with the help of a caliber, a suitable embodiment of which is shown in FIGS. 3 and 4.

The caliber 45 is constituted by a beam 46 and two end plates 47 and 48. The beam 46 is formed from a rectangular steel beam, all the supporting faces of which have been milled and accurately ground. The upper face of the beam has a central recess 49 so that the beam 22 of the scanner can be brought into the correct position in the caliber without touching the beam 46. The end faces of the beam 46 have each a vertical recess into which closely fit the end plates 47 and 48. The end plates are fixed into the recesses by a bolt such as 54 shown for the left-hand plate 47, the right-hand plate 48 being slightly withdrawn in the FIG. 4 representation to illustrate the engagement of the beam 22 with the end plates. This engagement occurs via pins 50, 51 and 52, 53 that protrude from the beam 22, and that accurately engage corresponding bores in the end plates.

In practice one end plate only is removed from the caliber and once the beam 22 has been brought into the correct position, the end plate is replaced and tightened to fix the position of the beam 22.

Next, the two glass rods 39 and 43 are placed in the corners formed by the adjacent supporting faces of the beams 22 and 46, and then the rods are urged over their full length into firm contact with said faces by pressure exerted on the rods in the directions of the arrows 61 and 62 by suitable means at longitudinally spaced intervals along the rods.

Such means may include simple lever-type hold-down clamps, hydraulic or pneumatic spanners, etc.

The displacements of portions of the rods to render them straight are small, and practice shows that such displacements seldom exceed 0.5 mm for rods with lengths up to 150 cm and diameters ranging between 11.6 and 12.4 mm. The forces for carrying out the described displacements remain generally below 20N for rods up to 12 mm in diameter.

Then spots of liquid adhesive are applied at longitudinally spaced areas, as indicated by the beads 56 and 57 in FIG. 3, and the areas 58 through 60 in FIG. 4.

The application may occur by hand, with the help of a small injection spout. The dropwise applied adhesive laterally spreads to form a bead with a length ranging between 10 and 20 mm approximately. If a UV-curable adhesive is used, the process of solidification of the adhesive may be reduced to half a minute only. The freely exposed beads of adhesive readily lend themselves to UV curing in the present example.

After the setting of the adhesive, the beam 22 is removed from the caliber with the two rods 39 and 43 adhering thereto, and is ready for its installation in the internal drum scanner.

The following data illustrate one embodiment of an internal drum scanner, in which a linear slide in accordance with the present invention was used.

Film sheet formats to be used in the drum: 8"×10", 10"×8", 14"×11", 14"×17"

Resolution: 12 dots/mm

Writing velocity: less than 20 s for one film

Number of image pixels: 2048 in the scanning direction 4096 in the cross scanning irecton standard glass rods manufactured by Schott Rods 39 and 43 length: 550 mm diameter: 12 mm mutual distance: 32 mm Supporting elements 34, 42: high density polyethylene, Trademark Werkstoff "S" grün, manufactured by Murtfeldt Kunststoffe, Dortmund, FRG.

The invention is not limited to the described embodiment. It is clear that the adhesive may be applied over the full length of the rods rather than on isolated spots thereof. Further, the adhesive may be applied on both sides of the contact place of a rod with the beam 22. It is clear that the caliber of FIGS. 3 and 4 does not permit the second side to be adhered, unless the beam with the rods adhered thereto by adhesive on the first side, has been removed.

It is also possible to strengthen and protect the adhesive regions 58 through 60 by applying another adhesive over and/or between them. Good results have been obtained by the application of a continuous bead of silicone rubber either on one or on both sides of the rods. Suchlike bead(s) also prevent(s) dust from collecting in the fine gaps at both sides of the contact zone rod/beam. Dust at suchlike place is difficult to remove.

The beam 22 need not necessarily be a solid beam as illustrated in the figures, but it may also be a hollow beam or a beam assembled from two or more parts.

The contact surface of a glass rod with the bearing beam may be enlarged by the provision of a V-like or curved groove in the surface of the beam so that the glass rod becomes journalled in such groove.

The exposure of the light-sensitive sheet may also occur on the outer surface of the cylinder, the cylinder being in this case made from glass.

I claim:

1. Image-reproducing apparatus comprising:
   a cylinder (20) which is arranged for receiving a light-sensitive recording sheet (28) on one of its surfaces,
   a reproducing head (21) for linewise exposing the said light-sensitive recording sheet to form an image thereon, said reproducing head bearing reflecting means (25) arranged for rotation about the axis of the cylinder to reflect a light beam that enters the cylinder axially, onto the surface of the cylinder, thereby to cause said beam to move along a circular track of the cylindrical surface, and said reproducing head being mounted on a linear slide (33) for displacement of the head in a direction parallel to the axis of the cylinder to cause progressive displacement of the circular track along the cylindrial surface, characterized in that said linear slide (33) is supported for its translation on two axially extending bearing rods (39, 43), said rods being glass rods that are fixed by an adhesive in accurate parallelism onto a bearing beam (22), and the contact of the linear slide with one rod (39) being a two-point sliding contact, and with the other rod (43) being a one-point sliding contact.

2. Image-reproducing apparatus according to claim 1, wherein said adhesive is a hardening adhesive.

3. Image-reproducing apparatus according to claim 2, wherein said adhesive is applied spotwise along the glass rods.

4. Image-reproducing apparatus according to claim 3, wherein said hardening adhesive is overcoated by a resilient adhesive.

5. Image-reproducing apparatus according to claim 1, wherein the two rods (39,43) are mounted in a vertical plane, the two-point contact occurring at the upper rod.

6. Image-reproducing apparatus according to claim 1, wherein said two-point contact is obtained via a V-shaped groove providing twin bearing surfaces (37,38) in a low-friction bearing guide block (34) fitted to the linear slide.

7. Image-reproducing apparatus according to claim 6, wherein the bearing block (34) is made from high-density polyethylene.

8. Image-reproducing apparatus according to claim 1, wherein the one-point contact is obtained via a single-surface bearing block (42).

9. Image-reproducion apparatus according to claim 1, wherein the driving of the linear slide (33) occurs by means of an endless belt (29) that is arranged for rotation in forward and backward direction, the coupling of the linear slide to the belt occurring through a flexible connection (63,64,65).

* * * * *